US007233916B2

(12) United States Patent
Schultz

(10) Patent No.: US 7,233,916 B2
(45) Date of Patent: Jun. 19, 2007

(54) METHOD AND SYSTEM FOR TRACKING CONTENT RENTAL

(75) Inventor: Charles P. Schultz, N. Miami Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 598 days.

(21) Appl. No.: 10/867,863

(22) Filed: Jun. 15, 2004

(65) Prior Publication Data
US 2005/0278228 A1   Dec. 15, 2005

(51) Int. Cl.
*G06Q 30/00* (2006.01)
(52) U.S. Cl. .................. 705/26; 340/309.16; 463/39
(58) Field of Classification Search .............. 705/26; 463/39; 340/309.16
See application file for complete search history.

(56) References Cited

U.S. PATENT DOCUMENTS

| 5,497,479 A | 3/1996 | Hornbuckle |
| 5,592,651 A | 1/1997 | Rackman |
| 5,613,089 A | 3/1997 | Hornbuckle |
| 5,654,746 A | 8/1997 | McMullan, Jr. et al. |
| 7,098,772 B2 * | 8/2006 | Cohen ................. 340/309.16 |
| 2003/0064805 A1 * | 4/2003 | Wells ........................ 463/39 |

FOREIGN PATENT DOCUMENTS

WO   WO 98/12862   *   3/1998

OTHER PUBLICATIONS

Chronis, George, "Microsoft with EB1", Video Business, dated Oct. 29, 2001.*

* cited by examiner

*Primary Examiner*—Mark Fadok
(74) *Attorney, Agent, or Firm*—Larry G. Brown

(57) ABSTRACT

The invention concerns a method (300, 400) and system (100) for tracking content rental. The method includes the steps of—from a portable electronic device (112)—requesting (312, 416) multimedia content for a rental session, determining (314, 418) whether the request for the rental session is authorized, receiving (320, 422) at the portable electronic device the multimedia content for the rental session if the request is authorized and terminating (324, 426) the rental session based on a predetermined power condition of the portable electronic device.

21 Claims, 3 Drawing Sheets

METHOD AND SYSTEM FOR TRACKING CONTENT RENTAL

BACKGROUND OF THE INVENTION

1. Field of the Invention

This invention relates in general to methods and systems for downloading content and more particularly, to mobile units that download content that can be rented.

2. Description of the Related Art

In recent years, portable electronic devices, such as cellular telephones and personal digital assistants, have become commonplace. These devices have increased in sophistication and complexity, and there is a current push to implement a wide array of functions in them, as well. For example, many mobile units have the capability to download multimedia content—such as ringtones, wallpaper and video games—from various Internet sites. Typically, the user of the mobile unit will pay a fee for access to the downloadable content.

As an alternative to purchasing such multimedia content, the user of the mobile unit may wish to lease or rent or otherwise have access to the content for a limited period of time. By renting the content, the user can determine whether he likes the game enough to buy it, which can facilitate the user's decision-making process. In addition, the user may enter a wireless local area network (WLAN) coverage area, and he may wish to participate for a certain amount of time in a gaming session having several competing players.

Because the access to such content is temporally restricted, there may be several ways to monitor the user's usage to ensure that he does not exceed the allotted period of use. For example, the actual number of sessions in which a user is involved can be tracked, or the actual amount of time that a user has access to the content can be monitored. As a more specific example, a user may be granted the right to play a video game for a limited amount of sessions, and once these sessions are expended, the user's access is removed. In addition, the user may be granted access to a video game for a limited amount of time. When this duration has expired, the user's access will be removed.

Both of these methods have disadvantages, however. In particular, a user may consume his limited amount of sessions as he learns to play or participate in the multimedia content. In effect, the user is punished for learning the game. Moreover, the date and time parameters that are used to track the amount of time can be manipulated in a dishonest way, which would then extend the user's access beyond the amount of time to which he was originally entitled.

SUMMARY OF THE INVENTION

The present invention concerns a method for tracking content rental. The method includes the steps of—from a portable electronic device—requesting multimedia content for a rental session, determining whether the request for the rental session is authorized, receiving at the portable electronic device the multimedia content for the rental session if the request is authorized and terminating the rental session based on a predetermined power condition of the portable electronic device. As an example, when the rental session is terminated, the predetermined power condition of the portable electronic device can be selected from at least one of the following: removal of a portable power source from the portable electronic device, the portable power source reaching a predetermined depletion threshold, the portable electronic device being charged or removal of power being received from the portable power source or an external source.

In one arrangement, the determining whether the request for the rental session step can include determining whether the request for the rental session is authorized based on the predetermined power condition. The method can also include the step of prohibiting the rental session if the request is not authorized. In this arrangement, the predetermined power condition of the portable electronic device can be selected from at least one of the following: the portable electronic device is in a charging condition; the portable electronic device is being powered from an external source; and the portable power source is an invalid portable power source.

In yet another arrangement, the method can further include the steps of wirelessly transmitting the multimedia content to the portable electronic device or providing the multimedia content in a portable storage unit and inserting the portable storage unit in the portable electronic device. As an example, the multimedia content can be downloadable software, and the receiving the multimedia content step can include downloading the software if the request is authorized. Additionally, the method can further include the step of uninstalling the software when the rental session is terminated. In another example, the portable electronic device can be a mobile communications unit, and the portable power source can be a rechargeable battery. Also, the multimedia content can be accessible from a wireless local area network coverage area.

The present invention also concerns a portable electronic device for tracking content rental. The portable electronic device includes a processor and a receiving section in which the processor is programmed to receive a request for a rental session of multimedia content and to determine whether the request for the rental session is authorized. The receiving section is coupled to the processor, and the receiving section receives the multimedia content for the rental session if the processor authorizes the request. The processor is further programmed to terminate the rental session based on a predetermined power condition of the portable electronic device. The mobile unit can also include suitable software and/or circuitry to carry out the processes described above.

The present invention also concerns a multimedia content rental system, which may also be mobile or portable. The system includes a multimedia content provider providing rental sessions for multimedia content and a portable communication device. The portable communication device includes a processor and a receiving section in which the processor is programmed to receive a request for a rental session of multimedia content and to determine whether the request for the rental session is authorized. The receiving section is coupled to the processor, and the receiving section receives the multimedia content for the rental session from the multimedia content provider if the processor authorizes the request. The processor is further programmed to terminate the rental session based on a predetermined power condition of the portable electronic device. The rental system can also include suitable software and/or circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
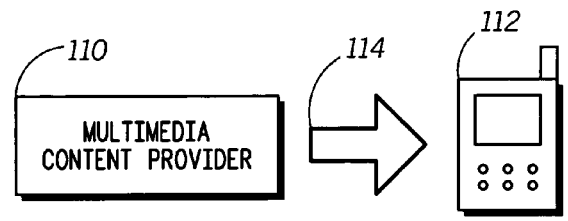
FIG. 1 illustrates a system for tracking content rental in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, a system 100 for tracking content rental is shown. The system 100 can include a multimedia content provider or source 110, a portable electronic device 112 and a link 114 between the multimedia content provider 110 and the portable electronic device 112. In one arrangement, the multimedia content provider 110 can provide multimedia files, applications or programs to the portable electronic device 112. As an example, multimedia content can include ringtones, wallpaper for a display, video games or any other application that can permit a user to engage in some form of interaction with the portable electronic device 112. The portable electronic device 110 can be any electronic device that can receive multimedia content, such as a mobile unit. The portable electronic device can also be an electrical component that receives multimedia content and can be installed in, for example, a vehicle—such as a car, boat or plane—or a building and can receive power from the electrical system of the vehicle or building.

In one particular arrangement, access to such multimedia content by a user of the portable electronic device 110 can be restricted. For example, the user of the portable electronic device 112 can have access to the multimedia content for the duration of a rental session. After the rental session is over, the user may no longer have access to the multimedia content. In another arrangement, a rental session can be based on a predetermined power condition of the portable electronic device 112. Examples of such conditions will be presented below. Granting the user access to multimedia content on a restricted basis can permit the user to sample or appraise the content to determine whether the user wishes to purchase the content for permanent use. Additionally, such a process can allow a user to participate in a game or some other content for a certain amount of time.

In one arrangement, the multimedia content provider or source 110 can be an entity that collects, stores and distributes multimedia content to, for example, portable electronic devices. For example, the multimedia content provider 110 can be a company that operates a Web site that offers for sale various types of multimedia content, which can be transferred to the portable electronic device 110. In this case, the link 114 can be a wireless link for permitting the multimedia content provider 110 to transfer wirelessly the multimedia content to the portable electronic device 112. Of course, the link 114 can also be a hard-wired communications link.

In an alternative arrangement, the multimedia content provider or source 110 can be a portable storage unit for storing the multimedia content. For example, the multimedia content provider 110 can be a flash memory card, a microdrive, an optical disc or storage, bubble memory, a read only memory device, organic memory, a magnetic disk, polymer memory or any other portable device that is capable of storing multimedia content. In this example, the portable electronic device 112 can include a receiver (not shown here) for receiving the portable storage unit, and the link 114 can be the physical insertion of the portable storage unit into the portable electronic device 112.

In one embodiment, the portable electronic device 112 can be a mobile communications unit, such as a cellular telephone, a two-way radio, a personal digital assistant, a handheld gaming device, a laptop computer, etc. Although a mobile communications unit will be used to describe many parts of the invention, it must be noted that the invention is in no way limited to use in such a device.

Figure 2:
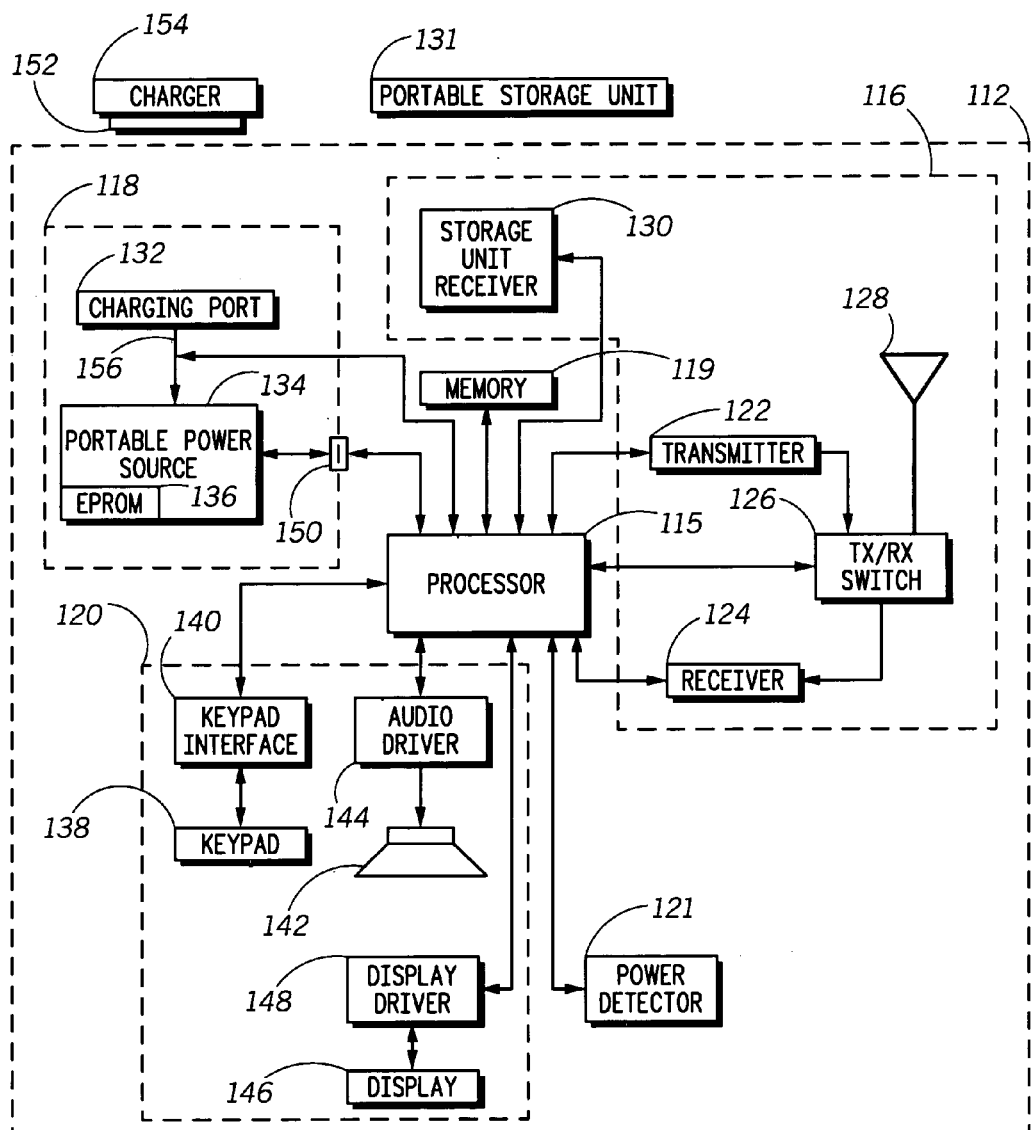
FIG. 2 illustrates a portable electronic device for tracking content rental in accordance with an embodiment of the inventive arrangements.

Referring to FIG. 2, a block diagram of a portable electronic device 112 in accordance with an embodiment of the inventive arrangements is shown. The portable electronic device 112 can include a processor 115, a receiving section 116, a charging section 118, a memory 119 and a user interface section 120. The portable electronic device 112 can also have a power detector 121. As will be explained later, the power detector 121 can be any component that can signal the processor 115 when, for example, the portable electronic device 112 is turned off by the user or when an external power source (not shown) providing power to the portable electronic device 112 is turned off.

The receiving section 116 can include a transmitter 122, a receiver 124, a transmitter/receiver (TX/RX) switch 126, an antenna 128 and a portable storage unit receiver 130 for receiving a portable storage unit 131. In addition, the processor 115 can be coupled to the transmitter 122, the receiver 124, the TX/RX switch 126 and the portable storage unit receiver 130. Also, the antenna 128 can be coupled to the TX/RX switch 126.

The charging section 118 can include a charging port 132 and a portable power source 134. As an example, the portable power source 134 can be a rechargeable battery having an electrically programmable read only memory (EPROM) 136. It is understood that the portable electronic device 112 is not limited to receiving power from a portable power source, as external sources, such as a vehicle's electrical system, can provide the power. The user interface section 120 can include a keypad 138, a keypad interface 140, a speaker 142, an audio driver 144, a display 146 and a display driver 148. The processor 115 can be coupled to the keypad interface 140, the display driver 148 and the audio driver 144. The processor 115 can also be coupled to the memory 119.

Through the receiving section 116, the portable electronic device 112 can transmit and receive wireless communications signals—such as voice and/or data signals—in a manner well known to those of skill in the art. For example, when receiving signals, the processor 115 can control the TX/RX switch 126, which can permit signals being received by the antenna 128 to pass to the receiver 124. The receiver 124 can convert and demodulate these signals, and in one arrangement, the processor 115 can transfer the received data to the memory 119, where it can be stored. In another arrangement, the processor 115 can forward the received signals to the user interface section 120. For example, as is known in the art, the received signals can be processed and transmitted to any relevant components of the user interface section 120. These signals can be converted into a form that can be received by a user, such as being broadcast on the speaker 142 or displayed by the display 146.

When the portable electronic device 112 is transmitting signals, the processor 115 can set the TX/RX switch to permit the transmitter 122 to transmit communications signals though the antenna 128. The portable electronic device 112 can transmit both voice and data signals. Although not shown, the portable electronic device 112 can include one or more microphones for capturing audio to be transmitted by the portable electronic device 112. In addition, in certain circumstances, such as when a user of the portable electronic device 112 is involved in a gaming session in a WLAN coverage area, user interactions through, for example, the keypad 138, can be transmitted through the receiving section 116. Although discussed primarily in terms of wireless communications, it is understood that the portable electronic device 112 can also be designed to receive signals from a hard-wired connection. In fact, the receiving section can be designed to merely include the portable storage unit receiver 130 for receiving portable storage units, if so desired.

Referring to the charging section 118, the portable power source 134 can be removable from the portable electronic device 112, as is commonly found in such units. The portable electronic device 112 can include a set of contacts 150. As is known in the art, these contacts can include, for example, B+, B−, ground and thermistor contacts. As is also known in the art, the processor 115 can detect the presence or absence of the portable power source 134 through the thermistor contact of the set of contacts 150.

The charging port 132 can receive a connector 152 of a charger or charging unit 154, which can provide power to the portable power source 134 or to any other circuits in the portable electronic device 112. Of course, the portable electronic device 112 (or the portable power source 134) is not limited to receiving power from a charging unit. Notably, the portable electronic device 112 and the portable power source 134 can receive power from any external source. An external source can be defined as any power source that can provide power to the portable electronic device 112 (and the portable power source 134) other than the portable power source 134. For example, the charging unit 154 can be referred to as an external source.

As those of skill in the art will appreciate, the processor 115 can be coupled—through any suitable mechanism—to a connection 156 between the charging port 132 and the portable power source 134. This configuration can allow the processor 115 to determine when the charging port 132 has received the charging unit 154, or any other external source. This design also allows the processor 115 to control the charging of the portable power source 134.

As noted earlier, the portable power source 134 can be a rechargeable battery having an EPROM 136. As is known in the art, the EPROM 136 can be programmed with certain types of identifying data. As is known in the art, through the set of contacts 150, the processor 115 can determine whether the portable power source 134 is authorized to be used with the portable electronic device 112. If the processor 115 does not recognize the data in the EPROM 136, the processor 115 can determine that the portable power source 134 is invalid or is not an authorized power source for use with the portable electronic device 112. In such a scenario, the processor 115 can prevent operation of the portable electronic device 112 until it recognizes the portable power source 134.

In one arrangement, the power detector 121 can be an on/off switch that controls the power to the portable electronic device 112. When the switch is activated, such as when the power is turned off, the power detector 121 can signal the processor 115. In another arrangement, the portable electronic device 112 may be receiving its power from an external source, such as a vehicle's electrical system. When the vehicle or other component housing the external source of power is turned off, the power detector 121 can also signal the processor 115. The action that the processor 115 can take in response to this signaling will be described below.

Referring to the user interface section 120, the processor 115 can transfer audio signals to the audio driver 144, and the signals can be broadcast from the speaker 142. Similarly, the processor 115 can feed video signals to the display driver 148, and the video signals can be displayed on the display 146. The display can be any suitable type of display, such as a liquid crystal display (LCD). A user can request the performance of various features by entering information through the keypad 138, and the instructions can be received by the keypad interface 140. The keypad interface 140 can then transfer these signals to the processor 115 for appropriate processing.

The portable electronic device 112 of FIG. 2 can be used to receive multimedia content. For example, a multimedia content provider 110 (see FIG. 1) can send multimedia content to the portable electronic device 112, where it can be received by the receiving section 116. As a more specific example, the multimedia content can be received at the antenna 128 and transferred to the receiver 124 through the TX/RX switch 126. The processor 115 can transfer the multimedia content to the memory 119 for later retrieval and/or can transfer the content to the user interface section 120 for display or broadcast.

As another example, the multimedia content provider 110 (see FIG. 1) can be a portable storage unit 131, and the portable storage unit receiver 130 can receive the portable storage unit 131. The processor 115 can then access the multimedia content from the portable storage unit 131 and can cause the content to be displayed or broadcast at the user interface section 120. In either arrangement, the user of the portable electronic device 112 can have restricted access to the multimedia content. The restricted access can be based on a predetermined power condition, such as the charge status of the portable power source 134 or whether the portable electronic device 112 is receiving power from an external source. Examples will be described below.

Figure 3:
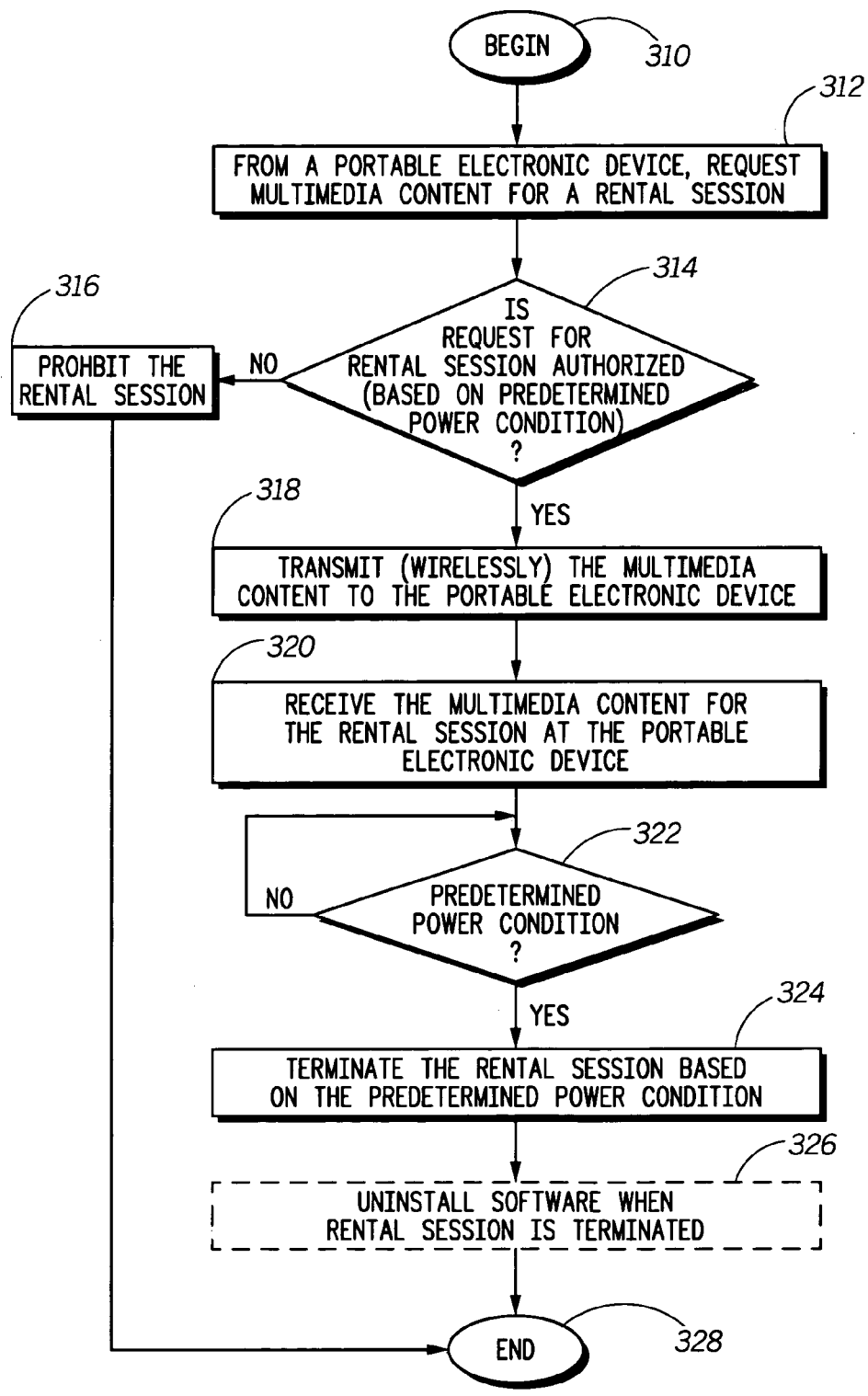
FIG. 3 illustrates a method for tracking content rental in accordance with an embodiment of the inventive arrangements.

Referring to FIG. 3, a method 300 for tracking content is shown. To illustrate the method 300, reference will be made to FIGS. 1 and 2. It is understood, however, that the inventive method can be practiced in any other suitable system or apparatus. The method 300 presents an example of a process in which multimedia content is transmitted to a portable electronic device, such as through a wireless or hard-wired connection. Of course, the invention is not limited to this particular procedure, and an alternative method will be described later. It must also be noted that the inventive method is not limited to the order in which the steps of the method 300 are shown and can even incorporate more or fewer steps than that illustrated.

At step 310, the method 300 can begin. At step 312, from a portable electronic device, a request for multimedia content for a rental session can be made. At decision block 314, it can be determined whether the request for the rental session is authorized (or enabled or allowed). In one arrangement, this authorization can be based on a predetermined power condition. If the request is authorized, the method 300 can continue at step 318. If it is not, then at step 316, the rental session can be prohibited, and the method 300 can stop at step 328.

For example, referring to FIGS. 1 and 2, a user, using the portable electronic device 112, can request a rental session for multimedia content. In particular, the user can make a request using the keypad 138 of the user interface section 120 or any other suitable user interface component. As noted earlier, multimedia content can include any file, application or program that can permit a user to engage in some form of interaction with the portable electronic device 112. As a more specific example, the user may wish to download a video game to the portable electronic device 112. Alternatively, the user may wish to participate in a video game that is accessible through a communications coverage area, such as a WLAN coverage area.

In one arrangement, the access to the multimedia content can be restricted, and the restriction can be based on a predetermined power condition. A predetermined power condition can mean any condition that relates to a power status of the portable electronic device 112. Examples of a predetermined power condition will be given below. In one arrangement, the user's access may be restricted in that he may only be able to access multimedia content for a limited amount of time, or he may be able to only access a portion of the multimedia content. In any event, this restricted access can be referred to as a rental session. In other words, a rental session can mean limiting in some form a user's access to multimedia content.

Once the user generates the request, the processor 115 can receive the request and can determine whether the request for the rental session is authorized. In one arrangement, the processor 115 can determine whether a predetermined power condition exists for purposes of the authorization process. If it does, the processor 115 can prohibit or prevent the occurrence of the rental session, e.g., the processor 115 will take no action to cause the portable electronic device 112 to receive the multimedia content.

There are several examples of a predetermined power condition. First, the portable electronic device 112 can be in a charging condition or can be powered from an external source, including a backup power source to the external source. An example of a charging condition or when the portable electronic device 112 is powered from an external source is when the charger 154, or some other external source, is coupled to the charging port 118 and is providing power to the portable electronic device 112 (or the portable power source 134).

There may be times where the portable electronic device 112 is meant to be powered from an external power source, such as the electrical system of a vehicle or airplane. In that case, this first predetermined power condition may not be applicable. Additionally, the first predetermined power condition may be overridden or ignored if the portable electronic device 112 is in a charging condition but the rental session has not yet started. This option can allow a user to fully charge the portable power source 134 before initiating the rental session. Any charging after the rental session is started, however, may be considered a predetermined power condition (see below).

A second example of a predetermined power condition is where the portable power source 134 is an invalid power source. In particular, the processor 115 can signal the EPROM 136 of the portable power source 134 through the set of contacts 150. If the processor 115 does not recognize the response that the EPROM 136 generates, the processor 115 can prohibit the receipt of any multimedia content.

It is understood, however, that the invention is not limited to these particular examples of predetermined power conditions, as other conditions are within contemplation of the inventive arrangements. Moreover, other factors can be used to determine whether the request is authorized, such as whether the user has paid for the multimedia content or is a member of a service that provides such content.

Referring back to FIG. 3, at step 318, the multimedia content can be transmitted to the portable electronic device. In one arrangement, the content can be wirelessly transmitted to the portable electronic device. At step 320, the multimedia content for the rental session can be received at the portable electronic device. For example, referring once again to FIGS. 1 and 2, once authorized, the processor 115 can, through the receiving section 116, signal the multimedia content provider 110. In response, the multimedia content provider 110 can transmit the content to the portable electronic device 112, where it can be received by the receiving section 116.

As an example, the multimedia content can be downloadable software or code for a video game. The multimedia content provider 110 can transmit this software to the receiving section 116, and the processor 115 can direct the content to the memory 119. This software can be installed and accessed during the rental session whenever appropriate. In another example, the processor 115 can request from the multimedia content provider 110, through the receiving section 116, access to a video game being played by other participants on a WLAN. The multimedia content provider 110 can grant the access, and the user can participate in the video game using the user interface section 120. It is understood that more than one rental session can occur at a given time.

Referring back to FIG. 3, at decision block 322, it can be determined whether a predetermined power condition has occurred. If it has not, the method 300 can resume at the decision block 322. If, however, a predetermined power condition has occurred, the method 300 can proceed at step 324, where the rental session can be terminated based on the predetermined power condition. In addition, as an option, any software on the portable electronic device can be uninstalled, as shown in step 326. The term uninstalled can include the steps of deleting files specific to the rental content or freeing up for subsequent applications the memory used by the rental content. The method 300 can then end at step 328.

In one arrangement, the rental session can continue until a predetermined power condition is detected. For example, the processor 115 can terminate the rental session by removing access to the multimedia content when it detects the predetermined power condition. There are several examples of predetermined power conditions. The first one is the removal of the portable power source 134 from the portable electronic device 112. As is known in the art, the processor 115 can detect the removal of the potable power source 134 (e.g., a rechargeable battery) through a thermistor contact (not shown) in the set of contacts 150.

Another example of a predetermined power condition is when the portable power source 134 reaches a predetermined depletion threshold. As an example, when the portable power source 134 discharges to a predetermined voltage level, the processor 115 can detect this depletion through the B+ contact (not shown) on the set of contacts 150. This voltage level can be, for example, the voltage at which the portable electronic device 115 will automatically power down when it is reached or any suitable level above the power-down level. Yet another example of a predetermined power condition is when the portable electronic device 112 is being charged. For example, when the charger 154 or any other external source is providing power to the portable electronic device 112, the processor 115 can detect this process through its monitoring of the connection 156 between the charging port 132 and the portable power source 134.

It must be noted that the portable electronic device 112 is not limited to receiving its power from the portable power source 134. For example, the portable electronic device 112 can receive its power from an external source, such as the electrical system for a car, plane or boat. Thus, another example of a predetermined power condition is when this external power source is removed or turned off. As a more specific example, the portable electronic device 112 can be part of a car's entertainment system in which the portable electronic device 112 receives power from the car's electrical system. Turning off the car, which in turn shuts off the power to the portable electronic device 112, can be considered a predetermined power condition. The power detector 121 can detect this removal of power and can signal the processor 115. Also, turning off the portable electronic device 112, for example, through the power detector 121, can remove the power being received from the portable power source 134. This process can be another example of a predetermined power condition. Of course, it must be stressed that the invention is in no way limited to these examples, as the predetermined power condition can be any condition that relates to the power status of the portable electronic device 112.

Once a predetermined power condition is detected, the processor 115 can terminate the rental session. For example, the processor 115 can cause the rented content to be erased from the memory 119, such as by setting all the bytes to OO or FF. Additionally, the processor 115 can free any bytes in the memory 119 that are associated with the rental content by deallocating blocks of memory that were allocated through a memory management subsystem. As another example, the processor 115 may cause any transmissions between the portable electronic device 112 and a WLAN to cease, which can prevent the user from continuing participation in the rental session. In another arrangement, if software has been downloaded into the memory 119, the processor 115 can cause the software to be removed or uninstalled from the memory 119, including any content-specific files and drivers. Those of skill in the art will appreciate that other measures can be taken to prevent the user from accessing the multimedia content once a predetermined power condition is detected. Those of skill will also understand that other suitable methods can be implemented to prevent the unusable content from occupying memory.

As noted above, one of the predetermined power conditions can be when the portable power source 134 reaches a predetermined depletion threshold. As also noted earlier, this depletion threshold can be at or near a voltage level that would normally cause the portable electronic device 112 to power down. Alternatively, the portable power source 134 may be removed from the portable electronic device 112 before it reaches the depletion threshold. In yet another example, power from an external power source may be abruptly removed. As such, arrangements can be made to cause the rental session to be terminated once the portable electronic device 112 is powered up again.

For example, a bit or flag in the memory 119 or some other non-volatile memory can be used to indicate to the processor 115 that access to the rented multimedia content should be removed. Specifically, the processor 115 can set this flag, which can be referred to as a terminate session flag, to a disable value, such as zero or one, when the portable electronic device 112 receives the multimedia content. In certain circumstances, a predetermined power condition may occur, such as the portable power source 134 reaching the depletion threshold or being completely removed from the portable electronic device 112 (or any external power source being removed). As a result, there may be little or no power available to permit the processor 115 to perform the steps necessary to terminate the rental session, such as uninstalling any relevant software.

When the portable power source 134 is replenished (or power is received once again from the external source) and the portable electronic device 112 powers up, the processor 115 can check the terminate session flag to determine whether the rental session needs to be terminated. If so, the processor 115 can cause the rental session to be terminated. The processor 115 can then set the terminate session flag back to an enable value, such as zero or one, to allow the portable electronic device 112 to receive rented multimedia content once again. Those of ordinary skill in the art will appreciate that other procedures can be used to cause the rental session to be terminated once the portable electronic device 112 is powered up again.

Figure 4:
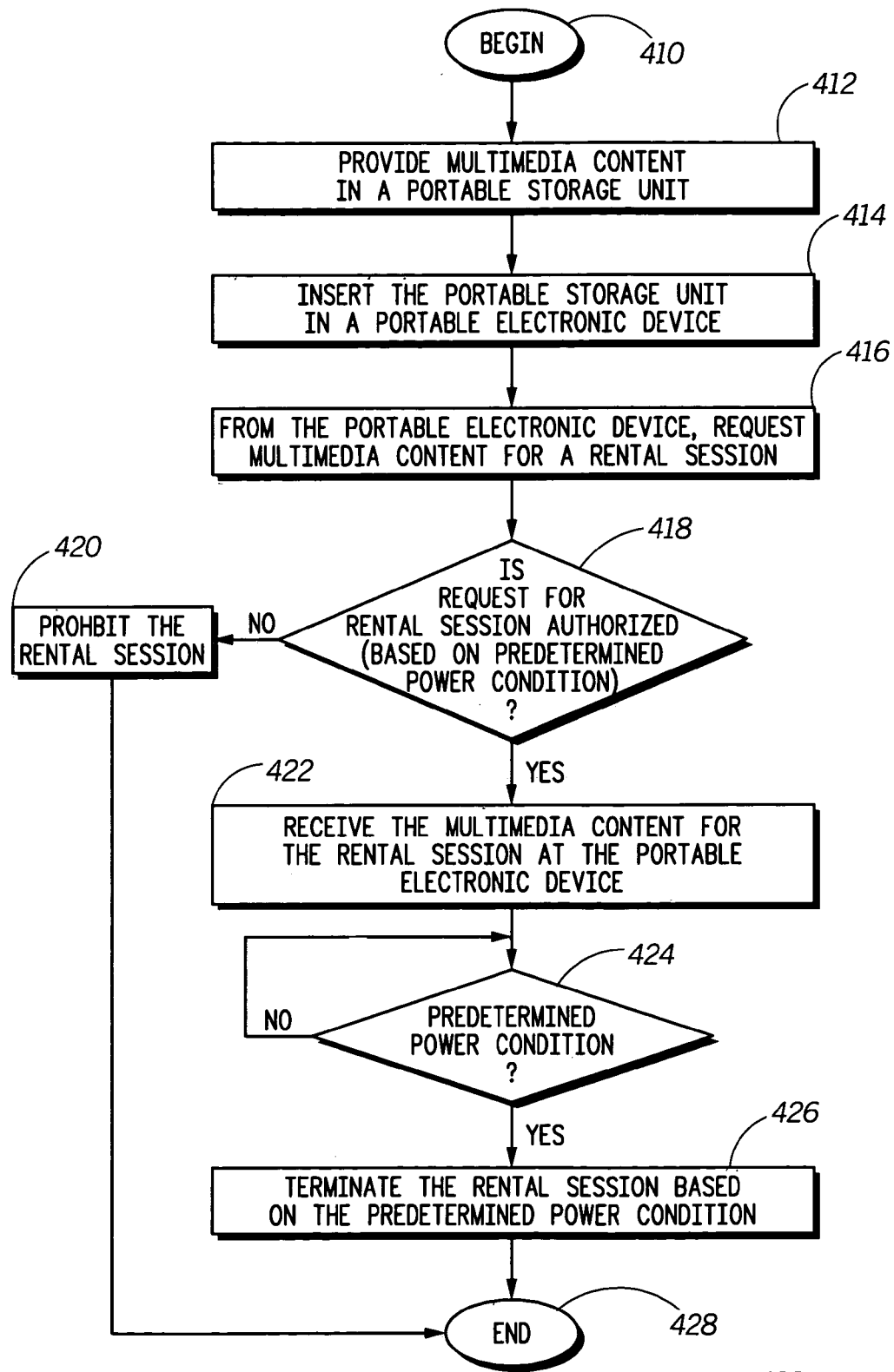
FIG. 4 illustrates another example of tracking content rental in accordance with an embodiment of the inventive arrangements.

Referring to FIG. 4, another method 400 for tracking content rental is shown. The method 400 is similar to the method 300 of FIG. 3. As such, where applicable, those descriptions that relate to the steps of the method 300 are relevant to the steps of the method 400. In addition, reference will be made to FIGS. 1 and 2 when describing the method 400, although it must be noted that the method 400 can be practiced in any other suitable system or device. It must also be noted that the inventive method is not limited to the order in which the steps of the method 400 are shown and can even incorporate more or fewer steps than that illustrated.

The method 400 can begin at step 410. At step 412, the multimedia content can be provided in a portable storage unit, and the portable storage unit can be inserted in a portable electronic device, as shown at step 414. For example, referring to FIG. 2, the multimedia content can be stored on a portable storage unit 131, which can be any device capable of storing such content, including but not limited to a flash memory card, a microdrive, an optical disc or storage, bubble memory, a read only memory device, organic memory, a magnetic disk, polymer memory or any other portable device that is capable of storing multimedia content.

When the user wishes to use the multimedia content for a rental session, the user can insert the portable storage unit 131 in, for example, the portable storage unit receiver 130 of the portable electronic device 112. Once inserted, the processor 115 can detect the presence of the portable storage unit 131 through any suitable means, as is well known in the art. It is understood that the term insert can mean any act that can enable the portable electronic device 112 to receive multimedia content from the portable storage unit 131. This term can even include the portable electronic device 112 remotely receiving the multimedia content from the portable storage unit 131.

Referring back to FIG. 4, at step 416, from the portable electronic device, a rental session for multimedia content can be requested. Also, at the decision block 418, it can be determined whether the request for the rental session is authorized. This authorization can be based on a predetermined power condition. If it is authorized, the method 400 can resume at step 422. If it is not authorized, the method 400 can move to step 420, where the rental session can be prohibited, and the method 400 can end at step 428.

For example, referring to FIG. 2, a user can request a rental session through the user interface section 120 of the portable electronic device 112. The processor 115 can then determine whether the rental session is authorized, which, in one arrangement, can be based on a predetermined power condition. Similar to the description with respect to the method 300, the predetermined power condition can be the portable electronic device 112 being in a charging condition or being powered from an external source or the portable power source 134 being an invalid power source.

Again, as an option, the predetermined power condition where the portable electronic device 112 is in a charging condition may be overridden or ignored to permit the user to charge the portable power source 134 before the rental session begins. Similarly, if the portable electronic device 112 is intended to receive power from an external source, e.g., the electrical system of a vehicle, the predetermined power condition of the portable electronic device 112 receiving power from an external source can also be ignored. In either arrangement, if the processor 115 detects a predetermined power condition, the processor 115 may prohibit the rental session by not accessing the multimedia content from the portable storage unit 131.

Referring back to FIG. 4, at step 422, the multimedia content for the rental session can be received at the portable electronic device. At decision block 424, it can be determined whether a predetermined power condition exists. If it does not exist, the method 400 can resume at decision block 424. If it does exist, the rental session can be terminated based on the predetermined power condition, as shown at step 426. The method 400 can then end at step 428.

For example, referring once again to FIG. 2, if authorized, the processor 115 can access the multimedia content from the receiving section 116 and can cause the multimedia content to be displayed to a user through the user interface section 120. If the processor 115 detects a predetermined power condition, the processor 115 can stop accessing the multimedia content from the portable storage unit 131 and the rental session can be terminated. The predetermined power conditions can be similar to those described in the corresponding decision block 322 of FIG. 3. Specifically, examples of predetermined power conditions are as follows: (1) the removal of the portable power source 134 from the portable electronic device 112; (2) the occurrence of the portable power source 134 reaching a predetermined depletion threshold: (3) when the portable electronic device 112 is being charged; and (4) removal of power being received from the portable power source or an external source. Once terminated, the user can remove the portable storage unit 131 from the portable electronic device 112.

There are several ways to control the access to the multimedia content stored on the portable storage unit 131. For example, the portable storage unit 131 can include two flags: a first flag indicating that the content is authorized for use and a second flag indicating that the user has begun to use the content. Thus, in one arrangement, once a user receives an authorized portable storage unit 131, a provider of the portable storage unit 131 can set the first flag to, for example, a value of one to indicate to the processor 115 that the use is authorized. In addition, this provider can set the second flag to, for example, a value of zero to show that the rental session has not yet started. At this stage, the portable storage unit 131 can be removed from the portable electronic device 112 and used at a later time, if so desired.

Once the portable electronic device 112 receives the portable storage unit 131 and the content is accessed, the processor 115 can set the second flag to, for example, a value of one to indicate that the rental session has started. After a predetermined power condition occurs (see the above examples), the processor 115 can check the status of the second flag. If the status of the second flag indicates that the rental session was previously started, the processor 115 can avoid accessing the multimedia content. The processor 115 can also reset the first flag (e.g., back to a value of zero) to indicate that the content on the portable storage unit 131 is no longer authorized for use.

The user can then make arrangements with the provider of the portable storage unit 131 to gain access to the multimedia content once again. That is, the provider can set the first flag to indicate that the rental session is authorized and the second flag to denote that the rental session has not yet started. Similar to the description relating to FIG. 3, these steps can be performed after the portable electronic device 112 powers up after a shutdown.

In another arrangement, steps can be taken to prevent the portable storage unit 131 from being used in a second portable electronic device 112. For example, matching encryption keys can be stored in the first portable electronic device 112 (the one intended to receive the multimedia content) and the portable storage unit 131. This process is commonly referred to as device locking. Attempting to use the multimedia content on a second portable electronic device 112 will fail because the second portable electronic device 112 will not have the appropriate key.

Another example of providing a rental session for multimedia content to users can include leasing or renting the portable electronic device 112 in addition to the multimedia content. For example, a user can rent the portable electronic device 112 from the multimedia content provider 110 (see FIG. 1). The multimedia content provider 110 can then provide the multimedia content in accordance with any of the examples described above. Alternatively, the multimedia content provider 110 may load the multimedia content into the rentable portable electronic device 112 prior to the user leasing the portable electronic device 112.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for tracking content rental, comprising the steps of:
    from a portable electronic device, requesting multimedia content for a rental session;
    determining whether the request for the rental session is authorized;
    receiving at the portable electronic device the multimedia content for the rental session if the request is authorized; and
    terminating the rental session based on a predetermined power condition of the portable electronic device.

2. The method according to claim 1, wherein when the rental session is terminated, the predetermined power condition of the portable electronic device is selected from at least one of the following:
    removal of a portable power source from the portable electronic device;
    the portable power source reaching a predetermined depletion threshold;
    the portable electronic device being charged; and
    removal of power being received from at least one of the portable power source and an external source.

3. The method according to claim 1, wherein the determining whether the request for the rental session step comprises determining whether the request for the rental session is authorized based on the predetermined power condition.

4. The method according to claim 3, further comprising the step of prohibiting the rental session if the request is not authorized, wherein the predetermined power condition of the portable electronic device is selected from at least one of the following:
    the portable electronic device is in a charging condition;
    the portable electronic device is being powered from an external source; and
    the portable power source is an invalid portable power source.

5. The method according to claim 1, further comprising the step of wirelessly transmitting the multimedia content to the portable electronic device.

6. The method according to claim 1, further comprising the steps of:
    providing the multimedia content in a portable storage unit; and
    inserting the portable storage unit in the portable electronic device.

7. The method according to claim 1, wherein the multimedia content is downloadable software and wherein the receiving the multimedia content step comprises downloading the software if the request is authorized and the method further comprises the step of uninstalling the software when the rental session is terminated.

8. The method according to claim 2, wherein the portable electronic device is a mobile communications unit and the portable power source is a rechargeable battery.

9. The method according to claim 1, wherein the multimedia content is accessible from a wireless local area network coverage area.

10. A portable electronic device for tracking content rental, comprising:
    a processor, wherein the processor is programmed to receive a request for a rental session of multimedia content and to determine whether the request for the rental session is authorized; and
    a receiving section coupled to the processor, wherein the receiving section receives the multimedia content for the rental session if the processor authorizes the request;
    wherein the processor is further programmed to terminate the rental session based on a predetermined power condition of the portable electronic device.

11. The portable electronic device according to claim 10, further comprising a portable power source, wherein when the rental session is terminated, the predetermined power condition of the portable electronic device is selected from at least one of the following:
    removal of the portable power source from the portable electronic device;
    the portable power source reaching a predetermined depletion threshold;
    the portable electronic device being charged; and
    removal of power being received from at least one of the portable power source and an external source.

12. The portable electronic device according to claim 10, wherein the processor is further programmed to determine whether the request for the rental session is authorized based on the predetermined power condition.

13. The portable electronic device according to claim 12, wherein the processor is further programmed to prohibit the rental session if the processor determines that the request is not authorized, wherein the predetermined power condition of the portable electronic device is selected from at least one of the following:
    the portable electronic device is in a charging condition;
    the portable electronic device is being powered from an external source; and
    the portable power source is an invalid portable power source.

14. The portable electronic device according to claim 10, wherein the multimedia content is wirelessly transmitted to the portable electronic device.

15. The portable electronic device according to claim 10, further comprising a portable storage unit receiver for receiving a portable storage unit, wherein the multimedia content is provided in the portable storage unit.

16. The portable electronic device according to claim 10, wherein the multimedia content is downloadable software and the processor is further programmed to download the software if the processor authorizes the request and wherein the processor is further programmed to uninstall the software when the processor terminates the rental session.

17. The potable electronic device according to claim 11, wherein the portable electronic device is a mobile communications unit and the portable power source is a rechargeable battery.

18. The portable electronic device according to claim 10, wherein the multimedia content is accessible from a wireless local area network coverage area.

19. A multimedia content rental system, comprising:

a multimedia content provider providing rental sessions for multimedia content; and a portable communication device, wherein the portable communication device comprises:
- a processor, wherein the processor is programmed to receive a request for a rental session of multimedia content and to determine whether the request for the rental session is authorized; and
- a receiving section coupled to the processor, wherein the receiving section receives the multimedia content for the rental session from the multimedia content provider if the processor authorizes the request;
- wherein the processor is further programmed to terminate the rental session based on a predetermined power condition of the portable electronic device.

20. The multimedia content rental system according to claim 19, wherein the multimedia content provider wirelessly transmits the multimedia content to the portable electronic device.

21. The multimedia content rental system according to claim 19, wherein the multimedia content provider is a portable storage unit and the portable electronic device further comprises a portable storage unit receiver for receiving the portable storage unit.

* * * * *